(12) United States Patent
Yoon et al.

(10) Patent No.: US 9,640,790 B2
(45) Date of Patent: May 2, 2017

(54) MIDDLE OR LARGE-SIZED BATTERY MODULE

(75) Inventors: Junill Yoon, Daejeon (KR); Jongmoon Yoon, Daejeon (KR); Jaesung Ahn, Daejeon (KR); Jong-yul Ro, Daejeon (KR); Jae Hun Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1025 days.

(21) Appl. No.: 12/301,008

(22) PCT Filed: May 4, 2007

(86) PCT No.: PCT/KR2007/002171
§ 371 (c)(1),
(2), (4) Date: Jul. 14, 2009

(87) PCT Pub. No.: WO2007/132991
PCT Pub. Date: Nov. 22, 2007

(65) Prior Publication Data
US 2009/0325043 A1 Dec. 31, 2009

(30) Foreign Application Priority Data
May 15, 2006 (KR) .................. 10-2006-0043196

(51) Int. Cl.
*H01M 2/02* (2006.01)
*H01M 10/48* (2006.01)
(Continued)

(52) U.S. Cl.
CPC ......... *H01M 2/206* (2013.01); *H01M 2/0247* (2013.01); *H01M 2/1072* (2013.01); *H01M 10/425* (2013.01); *H01M 10/48* (2013.01)

(58) Field of Classification Search
CPC .... H01M 4/0413; H01M 4/425; H01M 4/428; H01M 2/206; H01M 10/48;
(Continued)

(56) References Cited

U.S. PATENT DOCUMENTS 4,708,379 A * 11/1987 Ching .......................... 292/1.5
6,304,057 B1 * 10/2001 Hamada et al. ............. 320/107
(Continued)

FOREIGN PATENT DOCUMENTS

EP        1 333 520 A2    8/2003
JP        2004-031122 A    1/2004
(Continued)

*Primary Examiner* — Barbara Gilliam
*Assistant Examiner* — Helen M McDermott
(74) *Attorney, Agent, or Firm* — Birch, Stewart, Kolasch & Birch, LLP

(57) ABSTRACT

Disclosed herein is a middle- or large-sized battery module comprising a plurality of stacked unit cells, each unit module including two or more plate-shaped battery cells electrically connected with each other, each battery cell having electrode terminals formed at opposite sides thereof. The battery module is manufactured by connecting electrode terminals of a pair of unit modules by welding, mounting a sensing unit, including a sensing member, to the welding part and bending the welding part such that the unit modules are stacked, and repeatedly performing the above processes until all the unit cells are stacked.

15 Claims, 14 Drawing Sheets

(51) Int. Cl.
  *H01M 2/20* (2006.01)
  *H01M 2/10* (2006.01)
  *H01M 10/42* (2006.01)

(58) Field of Classification Search
  CPC .......... H01M 10/482; H01M 10/0413; H01M 2/0245; H01M 2/0247; H01M 2/1077
  USPC .............. 429/90–93, 96–100, 148, 149–154, 429/158–160, 163, 175–186
  See application file for complete search history.

(56) References Cited

U.S. PATENT DOCUMENTS

| | | | |
|---|---|---|---|
| 2002/0081491 A1 | 6/2002 | Gross et al. | |
| 2003/0215702 A1 | 11/2003 | Tanjou et al. | |
| 2003/0224246 A1* | 12/2003 | Watanabe et al. | 429/159 |
| 2004/0050414 A1 | 3/2004 | Oogami | |
| 2004/0119442 A1* | 6/2004 | Lee et al. | 320/112 |
| 2005/0042511 A1* | 2/2005 | Kaneta | 429/185 |
| 2006/0035141 A1* | 2/2006 | Lee | 429/176 |
| 2006/0063067 A1* | 3/2006 | Kim | 429/148 |
| 2006/0286452 A1* | 12/2006 | Takamatsu | 429/185 |
| 2008/0070102 A1* | 3/2008 | Watanabe et al. | 429/91 |

FOREIGN PATENT DOCUMENTS

| | | |
|---|---|---|
| JP | 2004-055490 A2 | 2/2004 |
| WO | WO 03/094258 A2 | 11/2003 |
| WO | WO-2005/074054 A1 | 8/2005 |
| WO | WO 2005117163 A1 * | 12/2005 |
| WO | WO 2006/046515 A1 | 5/2006 |
| WO | WO 2006/057291 A1 | 6/2006 |
| WO | WO 2006/059420 A1 | 6/2006 |
| WO | WO 2006/109610 A1 | 10/2006 |
| WO | WO 2007/102669 A1 | 9/2007 |
| WO | WO 2007/112116 A2 | 10/2007 |

* cited by examiner

700

MIDDLE OR LARGE-SIZED BATTERY MODULE

FIELD OF THE INVENTION

The present invention relates to a middle- or large-sized battery module, and, more particularly, to a middle- or large-sized battery module comprising a plurality of stacked unit cells, each unit module including two or more plate-shaped battery cells electrically connected with each other, each battery cell having electrode terminals formed at opposite sides thereof, wherein the battery module is manufactured by connecting electrode terminals of a pair of unit modules by welding, mounting a sensing unit, including a sensing member, to the welding part and bending the welding part such that the unit modules are stacked, and repeatedly performing the above processes until all the unit cells are stacked.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (i) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper and lower ends of a battery body 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part which is defined between the upper and lower sheathing parts of the sheathing member 14. The opposite sides 14a and the upper and lower ends 14b and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14a and the upper and lower ends 14b and 14c of the upper and lower sheathing parts of the sheathing member 14, which are in contact with each other, to each other by applying heat and pressure to the opposite sides 14a and the upper and lower ends 14b and 14c of the upper and lower sheathing parts of the sheathing member 14 so as to weld the resin layers thereof to each other. According to circumstances, the opposite sides 14a and the upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14, respectively. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability of the sheathing member 14.

However, the mechanical strength of the sheathing member 14 is low. In order to solve this problem, there has been proposed a method of mounting battery cells (unit cells) in a pack case, such as a cartridge, so as to manufacture a battery module having a stable structure. However, a device or a vehicle, in which a middle- or large-sized battery module is installed, has a limited installation space. Consequently, when the size of the battery module is increased due to the use of the pack case, such as the cartridge, the spatial utilization is lowered. Also, due to their low mechanical strength, the battery cells repeatedly expand and contract during the charge and the discharge of the battery cells. As a result, the thermally welded regions of the sheathing member may be easily separated from each other.

Also, since a battery module is a structural body including a plurality of battery cells which are combined with each other, the safety and the operating efficiency of the battery module are lowered when overvoltage, overcurrent, and overheat occurs in some of the battery cells. Consequently, a sensing unit for sensing the overvoltage, overcurrent, and overheat is needed. Specifically, a voltage sensor or a temperature sensor is connected to the battery cells so as to sense and control the operation of the battery cells in real time or at predetermined time intervals. However, the attachment or the connection of the sensing unit complicates the assembly process of the battery module. In addition, short circuits may occur due to the provision of a plurality of wires necessary for the attachment or the connection of the sensing unit.

In addition, when a middle- or large-sized battery module is constructed using a plurality of battery cells or a plurality of unit modules each of which includes a predetermined number of battery cells, a plurality of members for mechanical coupling and electrical connection between the battery cells or the unit modules are needed, and, as a result, a process for assembling the mechanical coupling and electrical connection members is very complicated. Furthermore, there is needed a space for coupling, welding, or soldering the mechanical coupling and electrical connection members with the result that the total size of the system is increased. The increase in size of the system is not preferred in the above-described aspect. Consequently, there is high necessity for a middle- or large-sized battery module that is more compact and structurally stable.

Furthermore, in a device, such as a vehicle, to which an external force, such as vibration and impact, is continuously applied, the increase of contact resistance at electrical connection regions may cause unsafe output and the occurrence of short circuits.

SUMMARY OF THE INVENTION

Therefore, the present invention has been made to solve the above problems, and other technical problems that have yet to be resolved.

Specifically, it is an object of the present invention to provide a middle- or large-sized battery module to which a sensing unit that is capable of minimizing the weight and size of battery cells while effectively reinforcing the low mechanical strength of the battery cells and sensing the operation state of the battery cells is stably mounted.

It is another object of the present invention to provide a middle- or large-sized battery module that is manufactured by a simple assembly process without using a plurality of members for mechanical coupling and electrical connection, whereby the manufacturing costs of the middle- or large-sized battery module are lowered, and that is effectively prevented from being short-circuited or damaged during the manufacture or the operation of the middle- or large-sized battery module.

In accordance with one aspect of the present invention, the above and other objects can be accomplished by the provision of a middle- or large-sized battery module comprising a plurality of stacked unit cells, each unit module including two or more plate-shaped battery cells electrically connected with each other, each battery cell having electrode terminals formed at opposite sides thereof, wherein the battery module is manufactured by connecting electrode terminals of a pair of unit modules by welding, mounting a sensing unit, including a sensing member, to the welding part and bending the welding part such that the unit modules are stacked, and repeatedly performing the above processes until all the unit cells are stacked.

The plate-shaped battery cells are secondary batteries having a small thickness and a relatively large width and length, such that the total size of the secondary batteries is minimized when the secondary batteries are stacked to construct a battery module. In a preferred embodiment, each plate-shaped battery cell is a secondary battery constructed in a structure in which an electrode assembly is mounted in a battery case made of a laminate sheet including a resin layer and a metal layer, and electrode terminals protrude from upper and lower ends of the battery case. Specifically, each battery cell is constructed in a structure in which the electrode assembly is mounted in a pouch-shaped battery case made of an aluminum laminate sheet. The secondary battery with the above-stated construction may be referred to as a pouch-shaped battery cell.

The case of the pouch-shaped battery cell may be constructed in various structures. For example, the case of the pouch-shaped battery cell may be constructed in a structure in which the electrode assembly is received in a receiving part formed at the upper inner surface and/or the lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly includes cathodes and anodes, by which the charge and the discharge of the battery are possible. The electrode assembly may be constructed in a structure in which the cathodes and the anodes are stacked while separators are disposed respectively between the cathodes and the anodes. For example, the electrode assembly may be constructed in a jelly-roll structure, a stacking type structure, or a composite structure. The cathodes and anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery.

The battery cells are covered, one by one or by twos or more, by the high-strength sheathing member made of metal or plastic so as to constitute a unit module. The high-strength sheathing member restrains the repetitive expansion and contraction change of the battery cells, during the charge and discharge of the battery cells, while protecting the battery cells having low mechanical strength, thereby preventing separation between sealing regions of the battery cells.

The battery cells may be connected in series and/or parallel with each other in one unit module, or the battery cells of one unit module may be connected in series and/or parallel with the battery cells of another unit module. Preferably, the battery cells may be connected in series with each other.

In a preferred embodiment, each unit module includes two battery cells, and each unit module is manufactured by welding one-side electrode terminals (hereinafter, referred to as 'lower electrode terminals') of the battery cells, bending the lower electrode terminals, such that the battery cells are brought into contact with opposite surfaces of a frame member used to manufacture each unit module, to mount the battery cells on the frame member while the battery cells are stacked, and covering the outer surface of the stacked battery cells with a metal sheathing member.

Preferably, a member for sensing voltage (voltage sensing member) is connected to the welding part of the lower electrode terminals, while the voltage sensing member is mounted in the frame member, the voltage sensing member being also connected to the outside of each unit module. In the specification, the sensing member included in the sensing unit may be referred to as a 'first sensing member,' and the voltage sensing member connected to the welding part of the lower electrode terminals may be referred to as a 'second sensing member,' so as to distinguish between the former and the latter.

The sensing unit, mounted to the connection region (welding part) of the electrode terminals (hereinafter, referred to as 'upper electrode terminals') between the unit modules, includes the first sensing member, as described above. Preferably, the first sensing member is used for voltage measurement. Preferably, the sensing unit includes an insulative unit body, of a thin hexahedral structure, disposed between the stacked unit modules, and the first sensing member mounted in the unit body. Also, the unit body is provided with a slit, into which the welding part of the upper electrode terminals is inserted, and the first sensing member is constructed in a structure in which one end of the first sensing member extends into the slit, and the other end of the first sensing member protrudes from the unit body to constitute a connection part such that the connection is accomplished in the slit when the welding part of the electrode terminals is inserted into the slit. Consequently, the sensing unit is disposed between two unit modules stacked to form a compact stacking structure during the manufacture of the battery module.

In a preferred embodiment, the connection part of the first sensing member protrudes from the unit body at the same surface as the surface where the slit is formed, and the connection part of the first sensing member protrudes from the upper ends of two neighboring unit modules by inserting the welding part of the upper electrode terminals of the unit modules into the slit and bending the upper electrode terminals such that the unit body is located between the unit modules. Consequently, it is possible to easily mount the sensing member for voltage measurement at the electrical connection region between the unit modules. Also, the connection part of the sensing member protrude from the upper ends of the stacked unit modules, and therefore, the connection between the connection part of the sensing member and an external circuit is very easily accomplished.

One or more insulative caps (lower-end caps) may be further mounted to the lower ends of the unit modules. The lower-end caps protect the lower electrode terminals (lower electrode terminals electrically connected) of the battery cells in the respective unit modules from the outside, thereby preventing the occurrence of short circuits. Especially, an integrated lower-end cap may serve to maintain the stacked state of the unit modules when it is mounted to the lower ends of two or more unit modules.

The lower-end caps may be mounted to the unit modules in various manners. For example, the lower-end caps may be independently molded bodies, which are mounted to the lower ends of the unit modules during the assembly process of the battery module or after the assembly of the battery module is completed, or the lower end of the battery module may be soaked in an insulative molten resin and then solidified after the assembly of the battery module is completed.

According to circumstances, one or more insulative caps (upper-end caps), which have the same purpose and structure as the lower-end caps and are formed by the same method as the lower-end caps, may be further mounted to the upper ends of the unit modules.

Preferably, each frame member is constructed in a lattice structure in which two battery cells are mounted to opposite sides of the frame member, each frame member is provided in the center of the upper end thereof with a through-hole, through which a temperature sensing member is inserted into a gap defined between the battery cells, and/or each frame member is provided in one side of the upper end thereof with an insertion hole, in which an external input and output terminal is mounted.

The electrical connection between the unit modules is accomplished by welding the upper electrode terminal of one unit module, which is not electrically connected to the upper electrode terminal of another unit module, to the upper electrode terminal of the neighboring unit module. Consequently, it is not necessary to mount external input and output terminals to the remaining unit modules excluding the outermost unit modules. However, the insertion hole, formed in one side of the upper end of each frame member, may serve as an indicator to confirm the proper stacking position (direction) of each unit module during the stacking of the unit modules, although the external input and output terminal is not mounted in the insertion hole.

On the other hand, the external input and output terminal is mounted in the insertion hole at each outermost unit module of the battery module, and the corresponding electrode terminal of each unit module is electrically connected to the external input and output terminal. The electrical connection may be accomplished in various manners. Preferably, a bus bar, used to electrically connect the external input and output terminal and the corresponding electrode terminal, is mounted to the upper end of each outermost unit module, while the outside electrode terminal of each outermost unit module is bent, such that the outside electrode terminal of each outermost unit module is brought into tight contact with the outer surface of the battery module.

Each frame member is not particularly restricted so long as each frame member is made of an insulative material having specific strength. For example, each frame member may be made of a thermoplastic resin having high formability. In a preferred embodiment, a narrow opening is formed in one side upper end and/or lower end of each high-strength sheathing member, a protrusion corresponding to the opening is formed at one side upper end and/or lower end of each frame member. Consequently, when the protrusion is brought into tight contact with the opening, while partially melting the protrusion, after the assembly of the unit modules is completed, the coupling force between each frame member and each metal sheathing member is increased.

According to circumstances, a relatively wide opening may be formed in the other side upper end and lower end of each high-strength sheathing member such that the wide opening is opposite to the narrow opening, and a mounting hole corresponding to the wide opening may be formed at the other side upper end and/or lower end of each frame member such that each unit module is fixed in a predetermined region by means of the mounting hole. Specifically, when a middle- or large-sized battery pack is constructed using the battery module according to the present invention, protrusions are formed, in a line, at the inner bottom of the device such that the battery module is mounted, while being erected, in a specific region of a device where the battery pack is installed, and the respective unit modules are mounted such that the protrusions are fitted in the corresponding holes of the frame members, whereby the installation of the battery pack is stably accomplished.

A consideration in manufacturing a compact battery module is to effectively remove heat generated from the battery cells during the charge and discharge of the battery cells. In the battery module of the present invention, it is necessary to stack the unit modules with high integration so as to accomplish the compact structure of the battery module. As a result, the dissipation of heat from the battery cells may not be satisfactory. Preferably, therefore, a plurality of protrusions are formed at the outer surface of the high-strength sheathing member constituting each unit module such that the protrusions extends in the lateral direction of each unit module while protruding outward, whereby coolant flow channels are formed during the stacking of the unit modules. The protrusions of one unit module are brought into contact with the protrusions of the neighboring unit module, during the stacking of the unit modules, such that gaps, i.e., flow channels, are defined between the corresponding protrusions.

In accordance with another aspect of the present invention, there is provided a middle- or large-sized battery pack including the battery module.

In a preferred embodiment, the battery module, including unit modules sufficient to provide desired output and capacity, is constructed in a structure in which the connection part of the first sensing member, the connection part of the second sensing member, and the connection part of the temperature sensing member protrude from the upper end of the battery module, and a battery management system (BMS), for controlling the operation of the battery module, is mounted to the upper end of the battery module. Consequently, the connection parts of the respective sensing members are directly connected to the BMS without using wires, and therefore, the assembly process is simplified, and it is possible to remove a possibility that short circuits occur due to the complex wires. The BMS may be manufactured in various forms. Preferably, the BMS is manufactured in the form of a printed circuit board (PCB). In this case, the connection parts of the respective sensing members are inserted into connection holes formed in the PCB BMS and are then soldered, whereby the electrical connection therebetween is accomplished.

The middle- or large-sized battery pack may be manufactured by interconnecting a plurality of battery modules, each of which includes one unit module or a predetermined number of unit modules. In the latter case, it is possible to accomplish the efficient arrangement of the battery pack in a limited installation space, and, when some battery modules get out of order, it is possible to easily replace the defective battery modules with new ones. Also, in the latter case, the BMSs assigned to the respective battery modules are slave BMSs, and therefore, it is possible to further include a main BMS to control the slave BMSs.

The middle- or large-sized battery pack according to the present invention has a compact structure, structural stability, and simple wiring structure. Preferably, therefore, the battery pack is used as a power source for transportation devices, such as, electric vehicles, hybrid electric vehicles, electric motorcycles, or electric bicycles, which have a limited installation space and to which external forces, such as vibration and impact, are continuously applied with the result that a possibility of short circuits occurring during the operation of the devices is very high.

Furthermore, the unit modules of each battery module, constituting the battery pack, may be mounted while the unit modules are erected. In this case, the battery pack is efficiently mounted in a limited installation space, such as a vehicle, which is further preferred.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
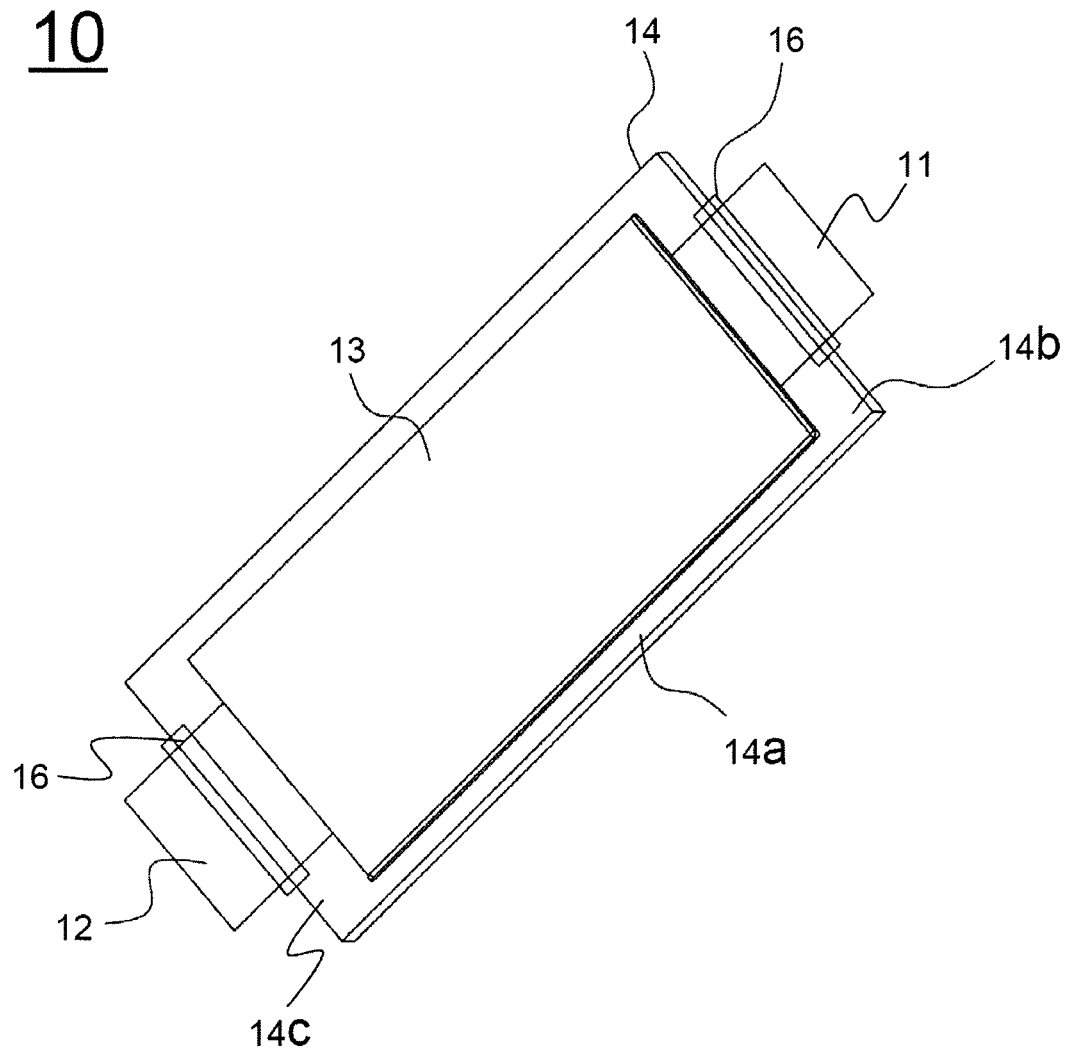
FIG. 1 is a perspective view illustrating a conventional representative pouch-shaped battery.
Figure 2:
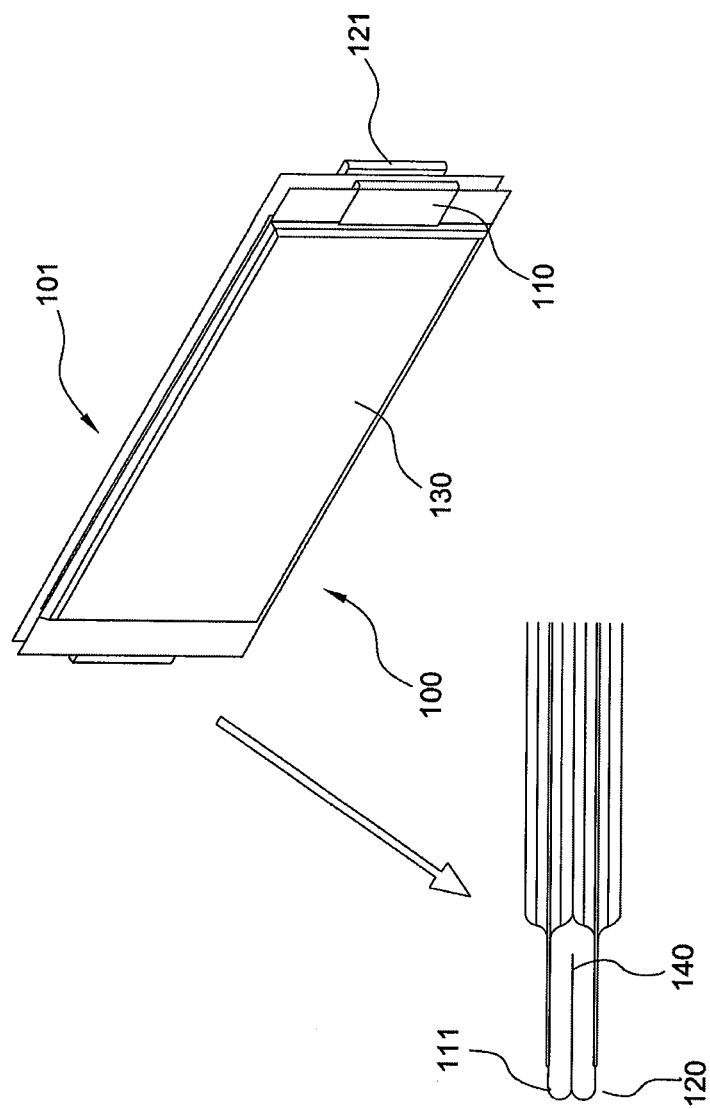
FIG. 2 is a perspective view illustrating two battery cells electrically connected with each other to construct a unit module, which is used to manufacture a battery module, according to a preferred embodiment of the present invention, including a partially enlarged view of the two battery cells.

FIG. 2 is a perspective view typically illustrating two battery cells electrically connected with each other to construct a unit module, which is used to manufacture a battery module, according to a preferred embodiment of the present invention, including a partially enlarged view of the two battery cells.

Referring to FIG. 2, the battery cell 100 is constructed in a structure in which a cathode terminal 110 and an anode terminal 120 located at opposite ends thereof, and an electrode assembly is mounted in a pouch-shaped battery case 130.

To construct a unit module, the two battery cells 100 and 101 are connected in series with each other by welding the anode terminal 120 of the battery cell 100 and a cathode terminal 111 of the battery cell 101 to each other, and the electrodes 120 and 111 are bent such that the surfaces of the battery cells 100 and 101 are brought into contact with each other. On the other hand, the cathode terminal of the battery cell 100 and an anode terminal 121 of the battery cell 101 are bent outward when the cathode terminal of the battery cell 100 and the anode terminal 121 of the battery cell 101 are welded to corresponding electrode terminals of neighboring unit modules (not shown) to which the unit module including the two battery cells 100 and 101 will be adjacent in a stacking process.

Figure 3:
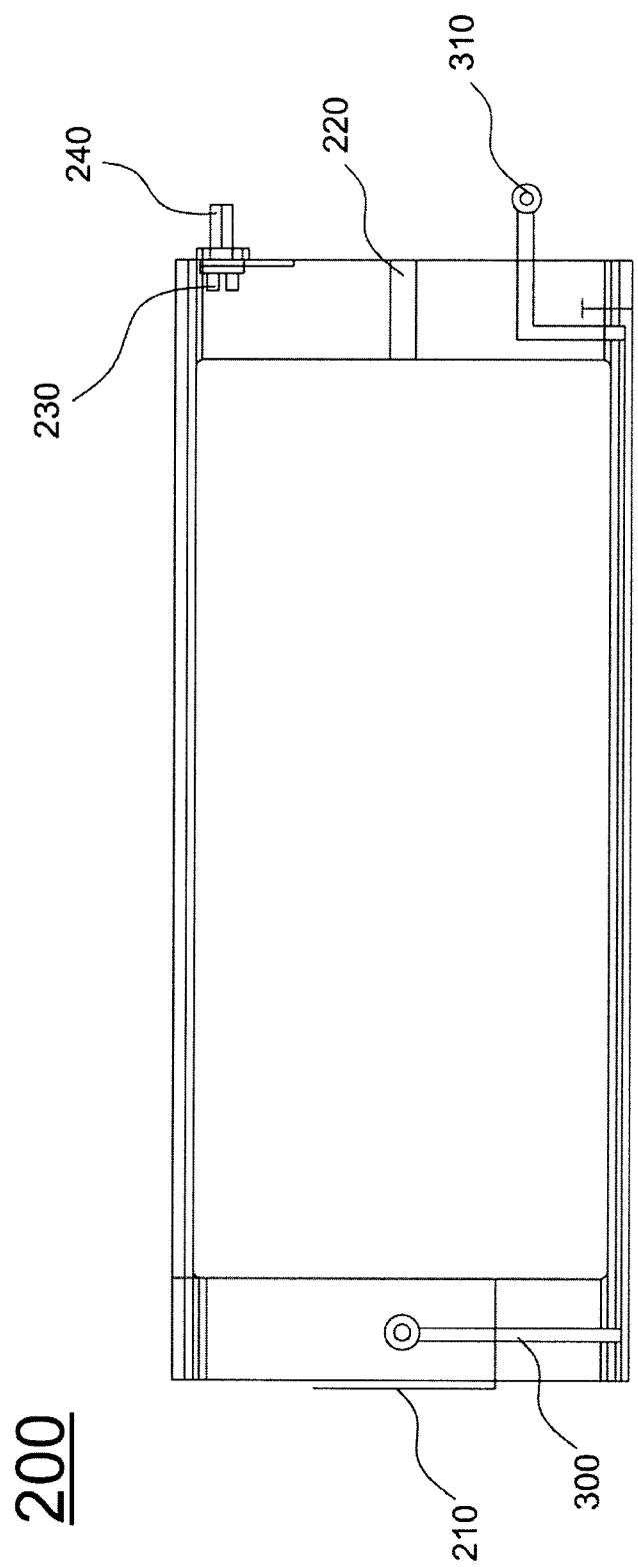
FIG. 3 is a front see-through view illustrating a frame member to which the battery cells shown in FIG. 2 will be mounted.

FIG. 3 is a front see-through view illustrating a frame member to which the battery cells shown in FIG. 2 will be mounted.

Referring to FIG. 3, the frame member 200 has a shape approximately corresponding to battery cells (not shown). The frame member 200 is constructed in a lattice structure to support only outer-edge sealing parts of the battery cells (i.e., regions where battery cases are thermally welded while electrode assemblies are mounted in the corresponding battery cases) while the battery cells are in tight contact with each other.

In the lower end of the frame member 200 is formed a slit 210, into which the bent welding part 140 (see FIG. 2) of the lower electrode terminals of the battery cells. At the lower end of the frame member 200 is mounted a second sensing member 300, which extends from the slit 210 toward the upper end of the frame member 200 along the side of the frame member 200. Consequently, a connection part 310 of the second sensing member 300 is connected with the electrode terminals when the welding part of the lower electrode terminals of the battery cells, inserted in the slit 210, is fixed to the frame member 200 using rivets. On the other hand, the connection part 310 of the second sensing member 300 protrudes from the upper end of the frame member 200, and therefore, the connection between the connection part 310 of the second sensing member 300 and a battery management system (BMS) is very easily accomplished.

In the center of the upper end of the frame member 200 is formed a through-hole 220, in which a temperature sensing member (not shown) is inserted. The through-hole 220 extends in the longitudinal direction of the frame member 200. In one side of the upper end of the frame member 200 is formed an insertion hole 230, in which an external input and output terminal 240 is mounted. The external input and output terminal 240 is mounted on the outermost unit module when constructing a battery module. Although the external input and output terminal 240 is not mounted in the insertion hole 230, however, the insertion hole 230 serves as an indicator to distinguish between the upper and lower ends of each unit module during the assembly of the battery module, because the insertion hole 230 is formed eccentrically in one side of the upper end of the frame member 200.

Figure 4:
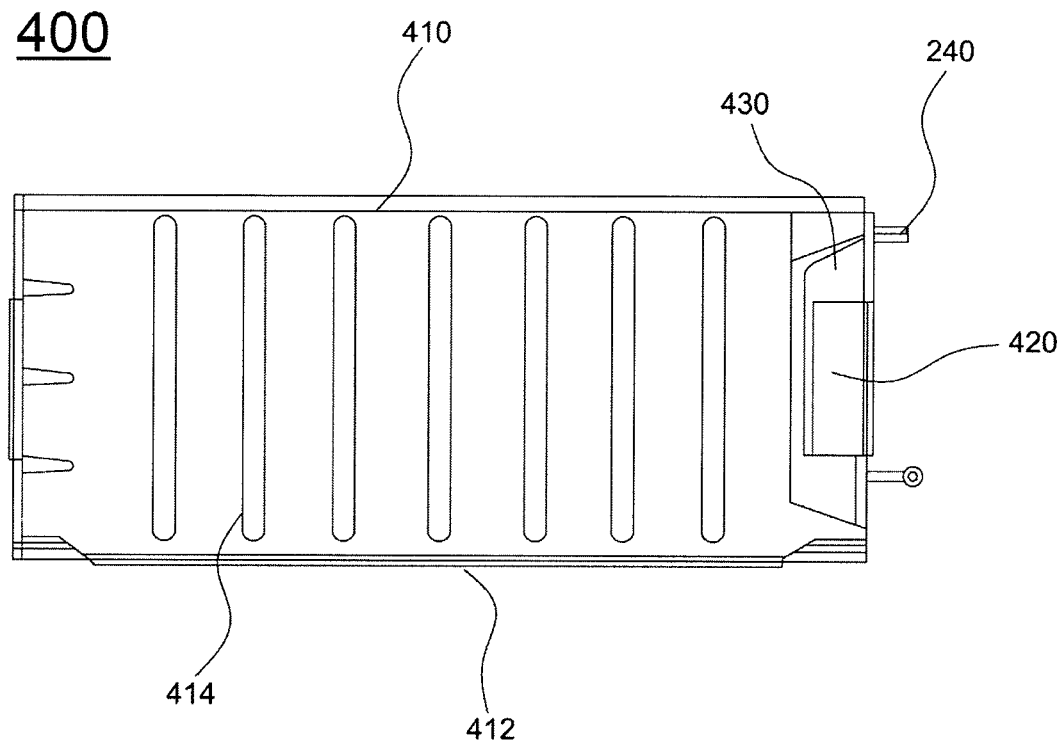
FIG. 4 is a plan view illustrating an exemplary unit module that can be used to manufacture a battery module according to the present invention.

FIG. 4 is a plan view typically illustrating an exemplary unit module that can be used to manufacture a battery module according to the present invention.

Referring to FIG. 4, the unit module 400 is constructed in a structure in which the battery cells 100 and 101 shown in FIG. 2 are covered by a metal sheathing member 410 while the battery cells 100 and 101 are mounted to the frame member 200 shown in FIG. 3. The metal sheathing member 410 is a metal plate which is bent, in an open shape, at one side thereof. The unit module 400 is manufactured by coupling the open side part 412 while the pair of battery cells, mounted to the frame member, are mounted in the metal sheathing member 410. The coupling may be accomplished in various methods, such as welding, mechanical coupling using a combination of hooks and coupling holes, and soldering.

When the external input and output terminal 240 is mounted in the upper-end insertion hole of the frame member 200 such that the unit module 400 is used as the outermost unit module of the battery module, a bus bar 430 for electrically connecting the external input and output terminal 240 and an upper electrode terminal 420 of the unit module 400 is mounted to the upper end of the unit module 400. The bus bar 430 is mounted in a structure to cover the upper electrode terminal 420, which is bent toward the upper-end outer surface of the unit module 400. Consequently, the bus bar 430 serves to stably maintain the bent state of the upper electrode terminal 420 as well as to perform the electrical connection between the external input and output terminal 240 and an upper electrode terminal 420 of the unit module 400.

At the metal sheathing member 410 forming the outer surface of the unit module 400 are formed a plurality of protrusions 414, which extends in the lateral direction of the unit module 400 while protruding outward. The protrusions 414 of the unit module 400 are brought into contact with protrusions of a neighboring unit module, during the stacking of the unit modules, such that flow channels are defined between the corresponding protrusions.

FIGS. 5 to 14 are side views and perspective views illustrating a process for manufacturing a middle- or large-sized battery module in accordance with a preferred embodiment of the present invention.

Figure 5:
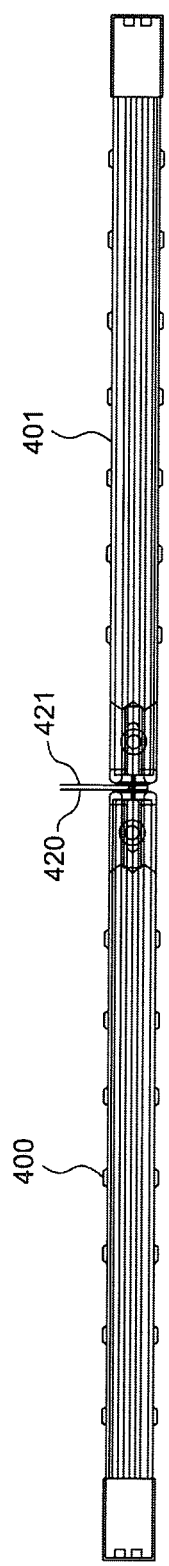
FIGS. 5 to 14 are side views and perspective views illustrating a process for manufacturing a middle- or large-sized battery module in accordance with a preferred embodiment of the present invention.

Referring first to FIG. 5, two unit modules 400 and 401 are welded to each other while upper electrode terminals 420 and 421 of the unit modules 400 and 401 are in contact with each other, and then the electrode terminals 420 and 421 are vertically bent such that the two unit modules 400 and 401 are parallel with each other.

Figure 15:
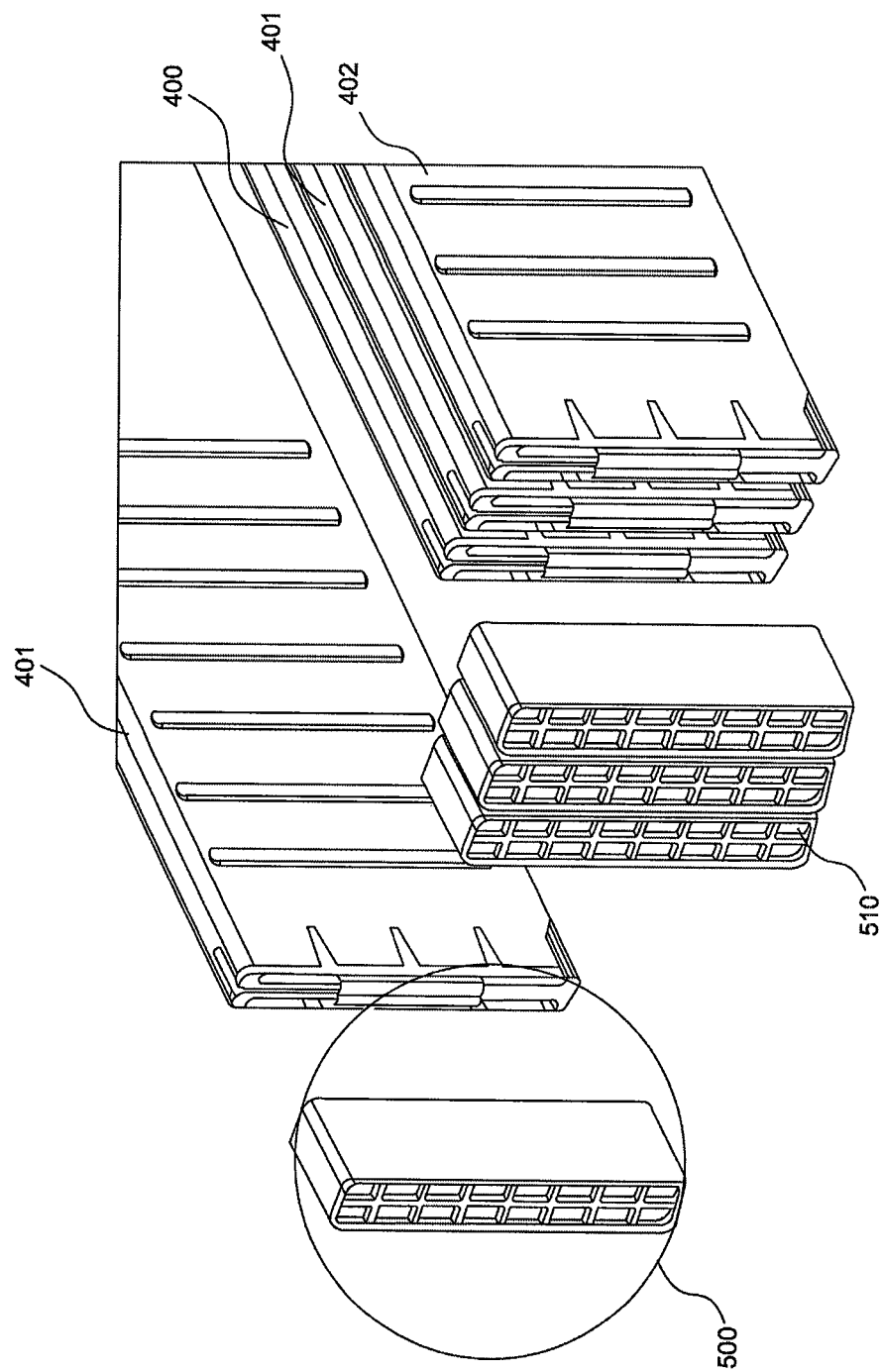
FIG. 15 is a perspective view illustrating the lower-end structure of a middle- or large-sized battery module according to a preferred embodiment of the present invention.

To the lower ends of the respective unit modules 400 and 401 are mounted caps (lower-end caps) 500, as shown in FIG. 15. The lower-end caps 500 prevent the lower electrode terminals from being exposed to the outside. According to circumstances, an integrated cap 510 may be mounted to the lower ends of a plurality of unit modules 400, 401, and 402. The integrated lower-end cap 510 may also serve to maintain the stacked state of the unit modules 400, 401, and 402.

Figure 6:
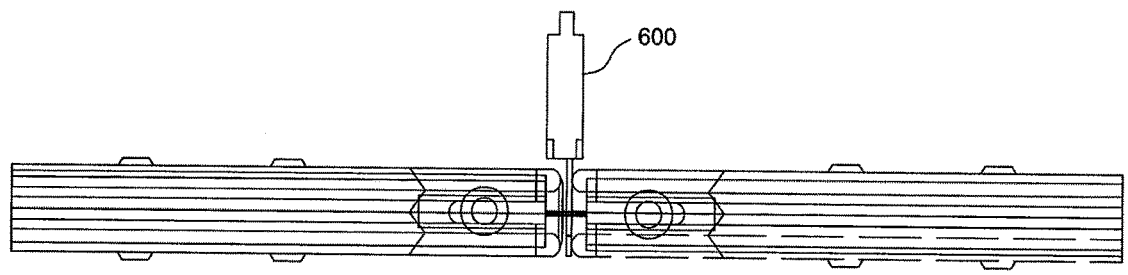
Figure 16:
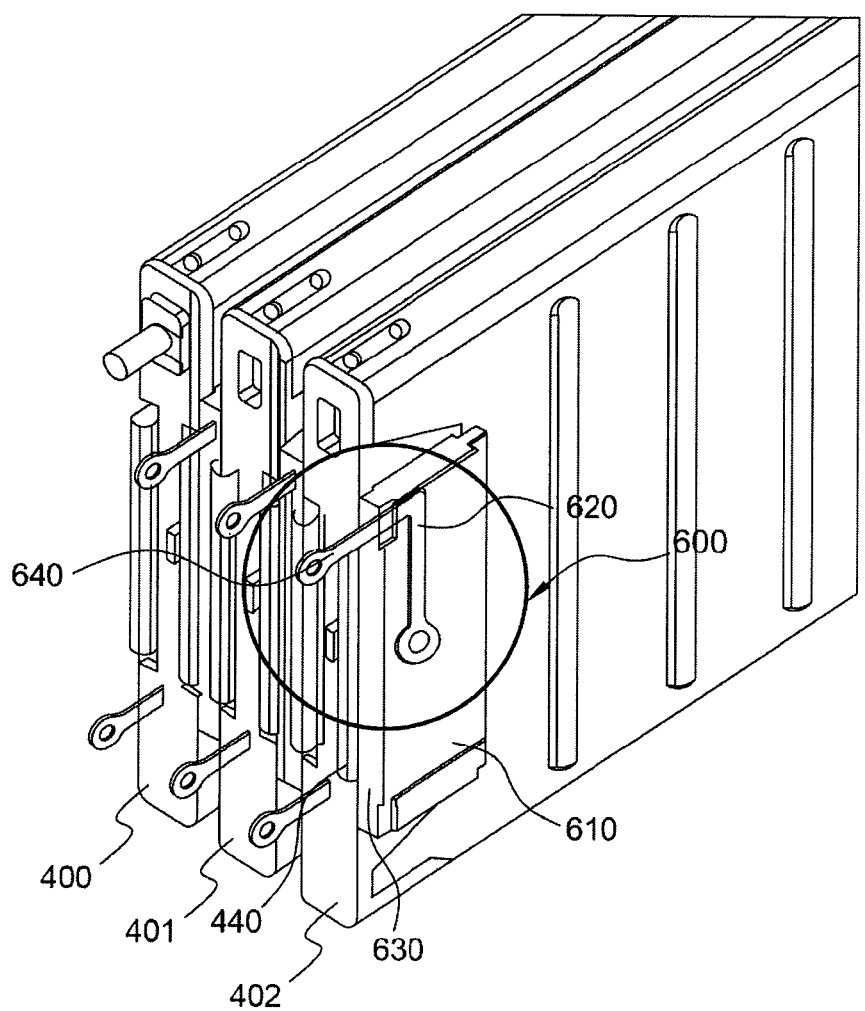
FIGS. 16 to 19 are partial perspective views, a plan view, and a whole perspective view illustrating the upper-end structure of a battery module according to a preferred embodiment of the present invention.

Referring to FIG. 6, a sensing unit for voltage measurement is mounted at the connection part of the electrode terminals of the unit modules. The detailed structure of the sensing unit 600 is shown in FIG. 16. Referring to FIG. 16, the sensing unit 600 includes an insulative unit body 610, of a thin hexahedral structure, disposed between the unit modules 400 and 401 to be stacked, and a first connection member 620 mounted in the unit body 610.

The unit body 610 is provided with a slit 630, into which a welding part of upper electrode terminals 440 is inserted, and a connection part 640 of the first connection member 620 protrudes from the unit body 610 at the same surface as the surface where the slit 630 is formed.

Figure 7:
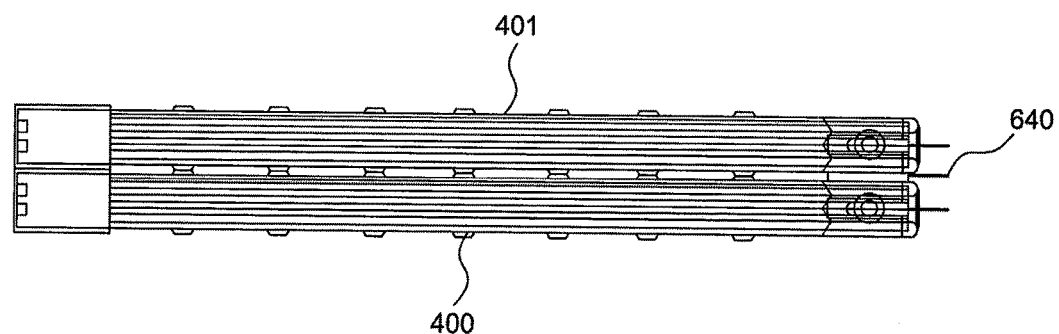

Referring to FIG. 7, the welding part of the upper electrode terminals of the two unit modules 400 and 401 is bent vertically again to form a stacking structure. At this time, the connection part 640 of the first sensing connection member 620 protrudes from the upper ends of the respective unit modules 400 and 401, and therefore, the connection between the connection part 640 of the first connection member 620 and an external circuit, such as a BMS, is very easily accomplished.

Figure 8:
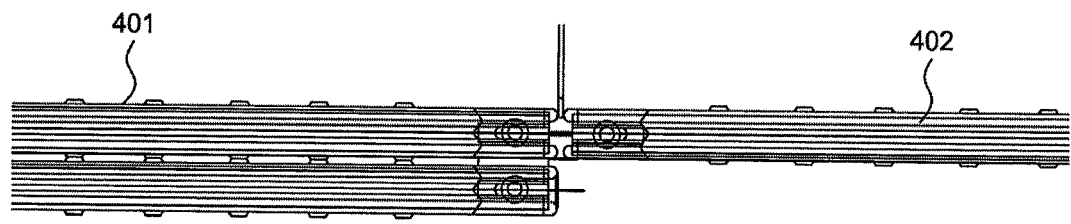
Figure 9:
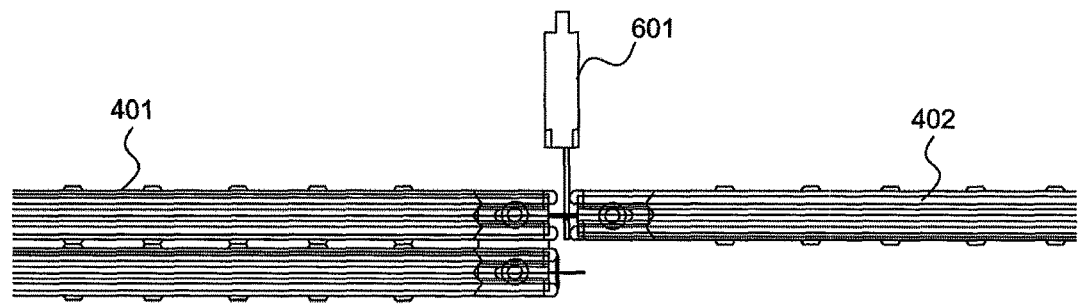
Figure 10:
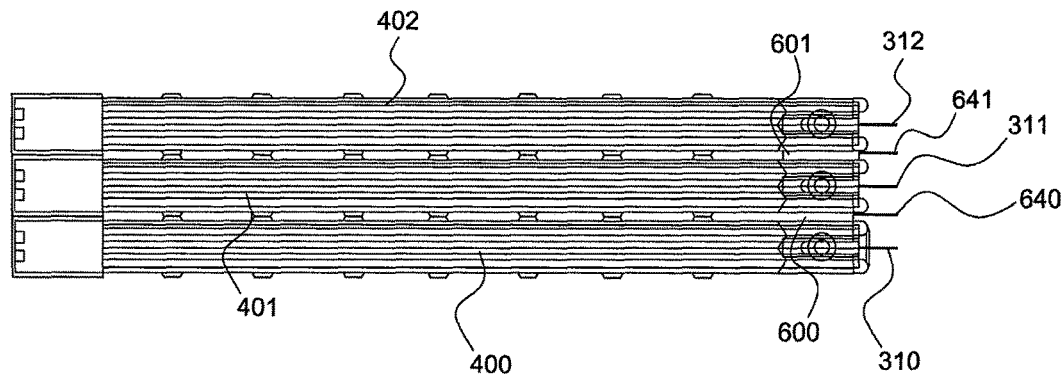

Referring to FIGS. 8 to 10, a process for welding the upper electrode terminals (FIG. 8), a process for mounting a sensing unit (FIG. 9), and a process for bending the welding part of the upper electrode terminals (FIG. 10) are carried out in the same manner as in FIGS. 5 to 7. As a result, another unit module 402 is electrically connected to the unit module 401 while the unit module 401 and 402 are arranged in a stacking structure.

Referring to FIG. 10, a total of five connection parts protrude from the three unit modules 400, 401, and 402 assembled through the above-described processes. Two of them are connection parts 640 and 641 of the sensing units 600, 601 mounted between the unit modules 400, 401, and 402. The remaining three are connection parts 310, 311, and 312 of second connection members (not shown) mounted to the frame members of the respective unit modules 400, 401, and 402.

Figure 11:
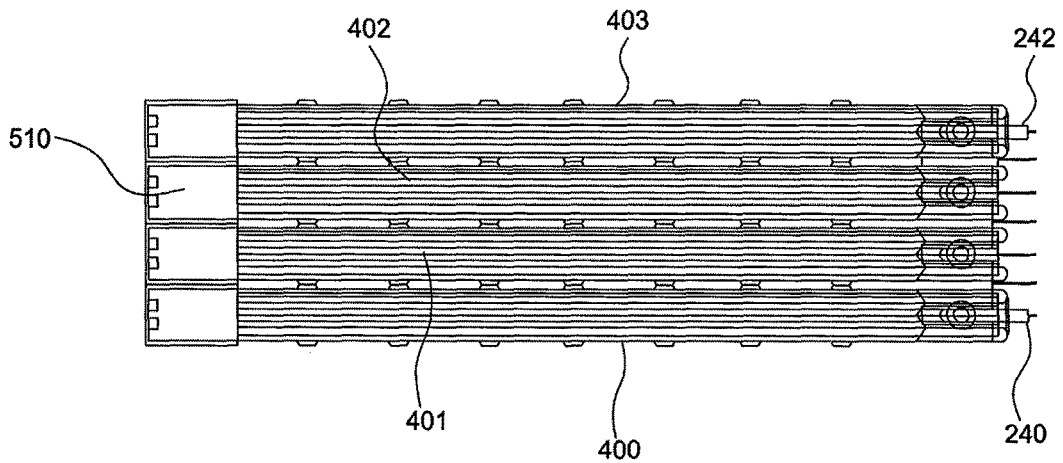
Figure 12:
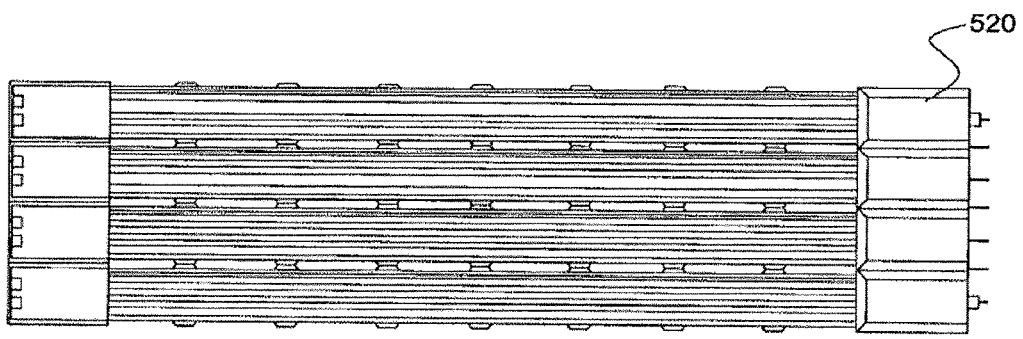

The structure of a total of four unit modules assembled through the above-described assembly process is illustrated in FIGS. 11 and 12.

Referring to FIG. 11, the four unit modules 400, 401, 402, and 403 are stacked while electrode terminals of the unit modules 400, 401, 402, and 403 are connected in series with each other. At the outermost unit modules 400 and 403 are mounted external input and output terminals 240 and 242. According to circumstances, upper-end caps 520 may be further mounted to the respective unit modules 400, 401, 402, and 403, as shown in FIG. 12.

Figure 13:
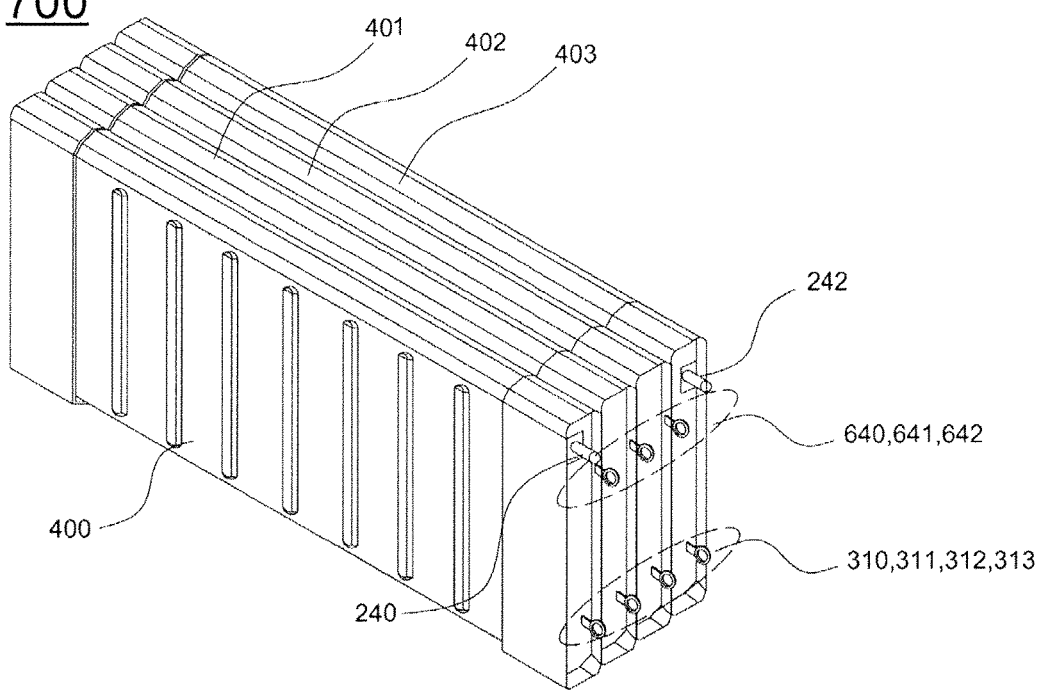
Figure 14:
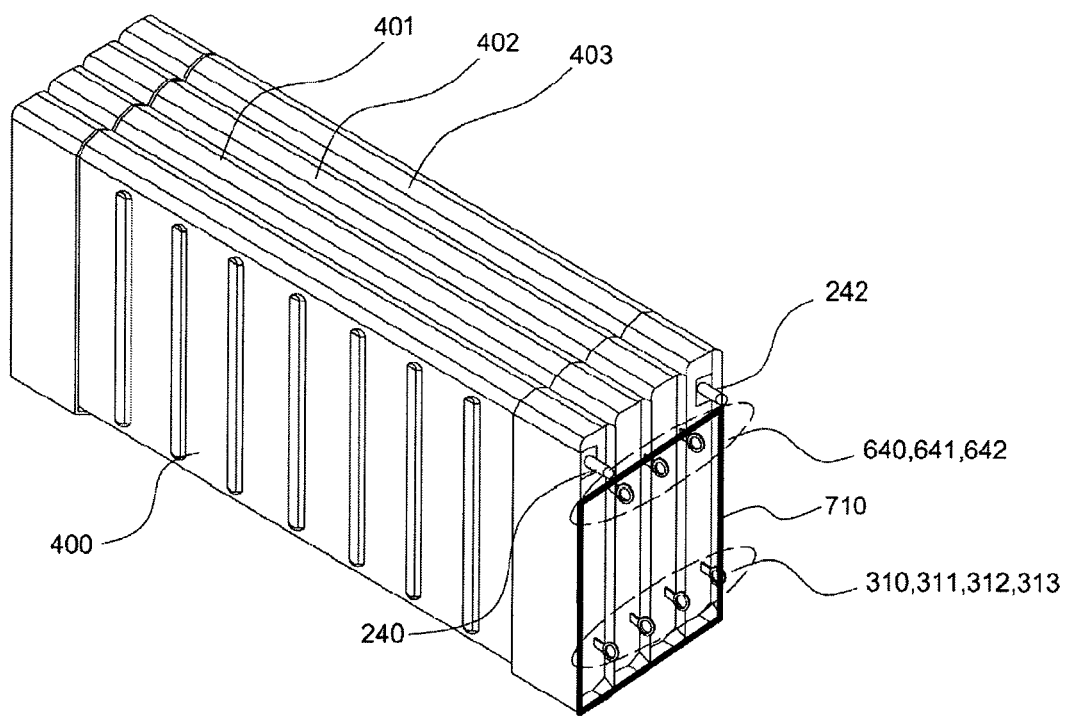

FIG. 13 is a perspective view typically illustrating a battery module after the assembly process is completed, and FIG. 14 is a perspective view typically illustrating the battery module to which a BMS is mounted.

Referring to FIG. 13, the four unit modules 400, 401, 402, and 403 each have two battery cells mounted therein.

Consequently, the battery module has a total of eight battery cells. These battery cells are electrically connected in series with each other. The external input and output terminals 240 and 242, one of which is a cathode and the other of which is an anode, are mounted at the outermost unit modules 400 and 403. Also, three connection parts 640, 641, and 642, protruding from the sensing units mounted to the upper electrode terminal welding parts between the unit modules 400, 401, 402, and 403, and four connection parts 310, 311, 312, and 313, protruding from the second connection members connected to the lower electrode terminal welding parts between the two battery cells mounted in the respective unit modules, protrude from the upper end of the battery module 700.

Referring to FIG. 14, a BMS printed circuit board (PCB) 710 is mounted at the upper end of the unit modules 400, 401, 402, and 403. The respective connection parts 640, 641, 642, 310, 311, 312, and 313 are connected to the BMS PCB 710.

Figure 17:
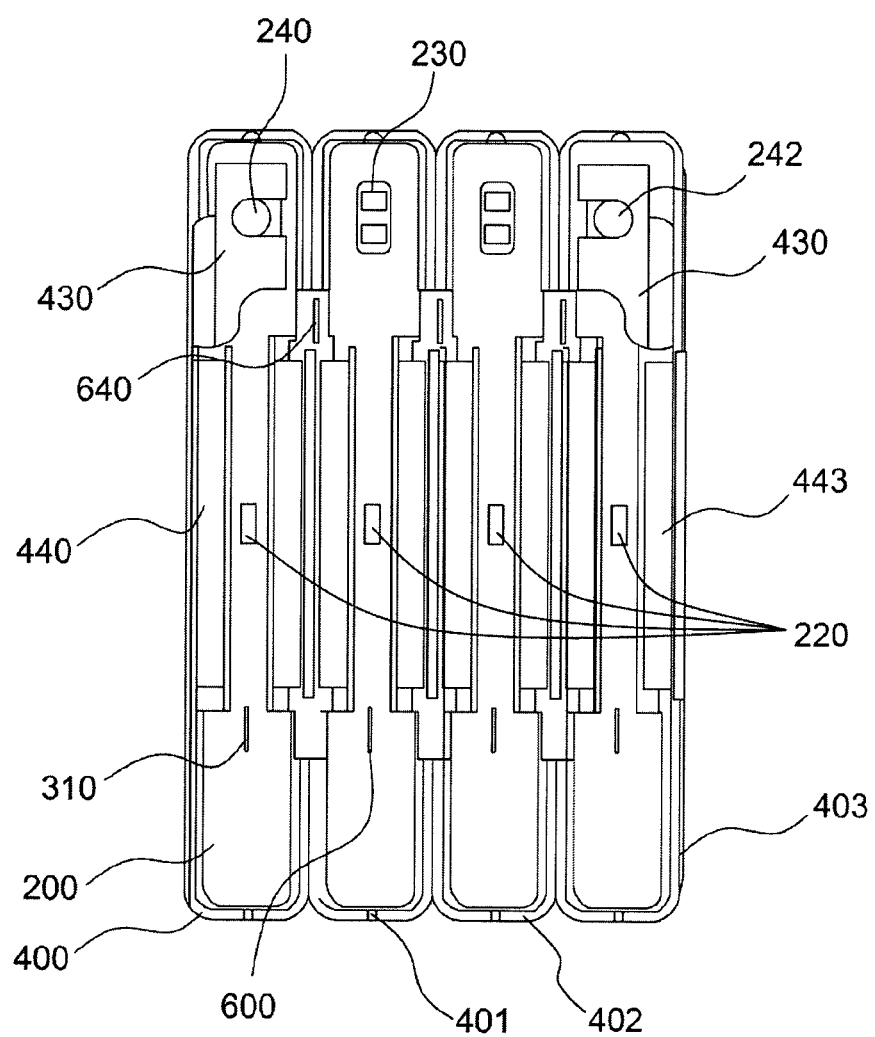
Figure 18:
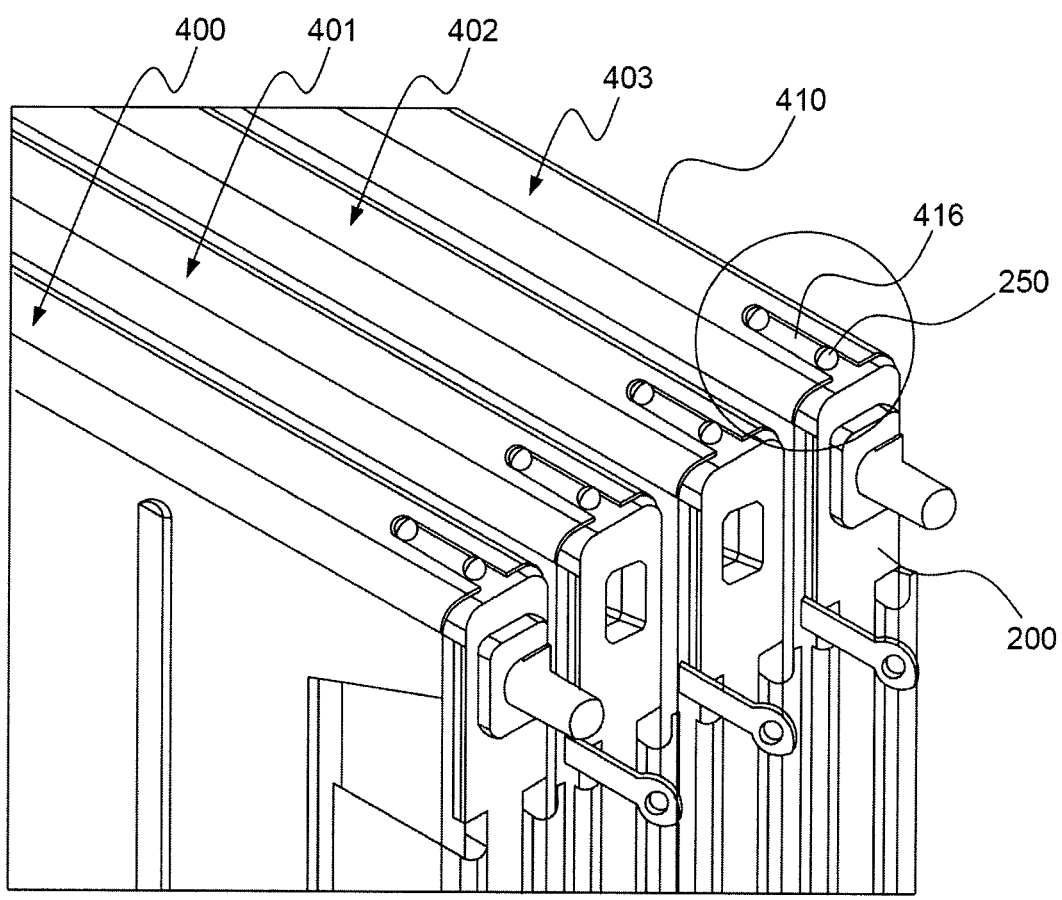
Figure 19:
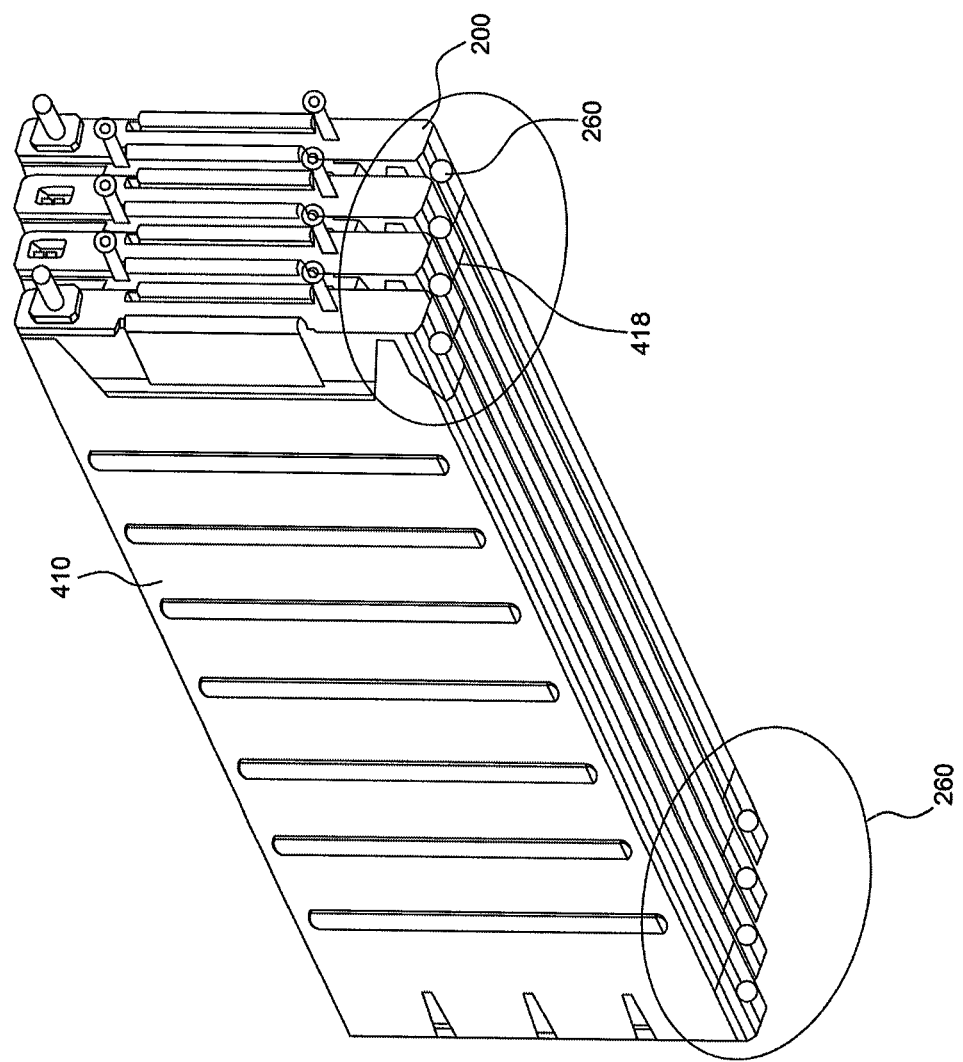

FIGS. 17 to 19 are a partial perspective view, a plan view, and a whole perspective view respectively illustrating the upper-end structure of the battery module constructed by performing the assembly processes, which is terminated at the process of FIG. 13. For convenience of understanding, the battery module is shown in FIGS. 18 and 19 while no bus bars are mounted to the external input and output terminals.

Referring first to FIG. 17, the external input and output terminals 240 and 242 are mounted to the outermost unit modules 400 and 403, respectively. The external input and output terminals 240 and 242 are electrically connected with the upper electrode terminals 440 and 443 via bus bars 430 mounted at the upper ends of the unit modules 400 and 403. The outside upper electrode terminals 440 and 443 of the outermost unit modules 400 and 403 are bent such that the upper electrode terminals 440 and 443 are brought into tight contact with the outer surfaces of the unit modules 400 and 403. The bus bars 430 are mounted at the upper ends of the unit modules 400 and 403 such that the bus bars 430 cover the bent regions. The external input and output terminals 240 and 242 are fixedly inserted in the insertion holes 230, formed in the one-side upper ends of the frame members 200 of the unit modules 400 and 403.

Referring to FIG. 18, a narrow opening 416 is formed in one side upper end of the metal sheathing member 410 constituting the outer surface of the unit module 403. At one side upper end of the frame member 200 is formed a protrusion 250 of the frame member 200 is brought unto tight contact with the opening 416. Consequently, when the protrusion 250 of the frame member 200 is brought into tight contact with the opening 416 of the metal sheathing member 410, while partially melting the protrusion 250 of the frame member 200, after the assembly of the unit modules is completed, the coupling force between the frame member 200 and the metal sheathing member 410 is increased.

Referring to FIG. 19, relatively wide openings 418 are formed in the other side upper end and lower end of the metal sheathing member 410. At the other side upper end and lower end of the frame member 200 are formed mounting holes 260 corresponding to the openings 418 such that the unit module is fixed in a predetermined region by means of the mounting holes 260.

Referring back to FIG. 17, the connection part 310 protrudes from one side of the upper end of each frame member 200 while the connection part 310 extends from the corresponding second sensing member. The through-hole 220 is formed in the center of the upper end of each frame member 200 such that a temperature sensing member (not shown) for measuring the temperature of two battery cells in each unit module is inserted into the through-holes 220.

Also, the connection part 640 also protrudes from the sensing unit 600, in which the welding part of the upper electrode terminals is inserted, between the unit modules 400 and 401.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of easily mounting a sensing unit that is capable of minimizing the weight and size of battery cells while effectively reinforcing the low mechanical strength of the battery cells and sensing the operation state of the battery cells to a middle- or large-sized battery module. In addition, the present invention has the effect of manufacturing the battery module by a simple assembly process without using a plurality of members for mechanical coupling and electrical connection, thereby decreasing the manufacturing costs of the battery module, and effectively preventing the battery module from being short-circuited or damaged during the manufacture or the operation of the battery module. Furthermore, the present invention has the effect of easily manufacturing a middle- or large-sized battery pack having desired output and capacity using the battery module as a unit body.

What is claimed is:

1. A battery module comprising:
a plurality of stacked unit modules, each unit module including:
two battery cells;
a frame, the battery cells contacting the frame;
a metal sheathing encircling the two battery cells;
lower electrode terminals of each of the two battery cells directly attached to each other at a lower end of the unit module;
upper electrode terminals of each of the two battery cells extending from an upper end of each unit module, each of the upper electrode terminals directly connected to respective adjacent unit modules at a welding part of the upper electrode terminal; and
a second sensing member for voltage measurement connected to the lower electrode terminals, the second sensing member mounted at a lower end of the frame, the lower end of the frame corresponding to the lower end of the unit module; and
a connection part extending from the second sensing member,
a first sensing unit directly connected to distal ends of the connected upper electrode terminals, the first sensing unit being between two stacked unit modules;
wherein the first sensing unit includes:
a first sensing member for voltage measurement,
an insulative unit body, the first sensing member mounted in the insulative unit body, and
a connection part of the first sensing member protruding from the insulative unit body,
wherein the connection part of the first sensing member and the connection part of the second sensing member protrude from an upper end of the battery module, the upper end of the battery module corresponding to the upper end of the unit modules,
wherein each metal sheathing includes a plurality of first protrusions formed at the outer surface of the metal sheathing such that the first protrusions extend in the lateral direction of each unit module, and
wherein a first opening is formed in an upper end or a lower end of each metal sheathing, and a second protrusion corresponding to the first opening is formed at the upper end or the lower end of each frame.

2. The battery module according to claim 1, wherein each battery cell is a secondary battery having an electrode assembly mounted in a battery case made of a laminate sheet including a resin layer and a metal layer, and the upper and lower electrode terminals protrude respectively from upper and lower ends of the battery case.

3. The battery module according to claim 1, wherein lower end caps are further mounted to the lower ends of the unit modules.

4. The battery module according to claim 3, wherein the lower-end caps are independently molded bodies, which are mounted to the lower ends of the unit modules during the assembly process of the battery module or after the assembly of the battery module is completed, or the lower end of the battery module is soaked in an insulative molten resin and then solidified after the assembly of the battery module is completed.

5. The battery module according to claim 1, wherein one or more insulative upper end caps are further mounted to the upper ends of the unit modules.

6. The battery module according to claim 1, wherein each frame has a lattice structure in which two battery cells are mounted to opposite sides of the frame, and each frame is provided in the center of the upper end thereof with a through-hole, through which a temperature sensing member is inserted into a gap defined between the battery cells.

7. The battery module according to claim 6, wherein the connection part of the first sensing member, the connection part of the second sensing member, and a connection part of the temperature sensing member protrude from the upper end of the battery module, and a battery management system (BMS), for controlling the operation of the battery module, is mounted to the upper end of the battery module.

8. The battery module according to claim 1, wherein an external input and output terminal are mounted to each outermost unit module of the battery module, and one of the upper electrode terminals of each outermost unit module is electrically connected to the external input and output terminal via a bus bar.

9. The battery module according to claim 8, wherein the bus bar is mounted to the upper end of each outermost unit module, while the upper electrode terminal of each outermost unit module is brought into tight contact with an outer surface of the battery module.

10. The battery module according to claim 1, wherein a second opening is formed in the upper end or lower end of each metal sheathing such that the second opening is opposite to the first opening, the second opening being wider than the first opening, and a mounting hole corresponding to the second opening is formed at the upper end or lower end of each frame such that each unit module is fixed in a predetermined region by means of the mounting hole.

11. A battery pack including the battery module according to claim 1.

12. The battery pack according to claim 11, wherein the battery pack is manufactured by interconnecting a plurality of battery modules, each of which includes one unit module or a predetermined number of unit modules.

13. A battery module comprising:
a plurality of stacked unit modules, each unit module including:
two or more plate-shaped battery cells electrically connected with each other, each battery cell having electrode terminals formed at opposite sides thereof;
a housing surrounding the two or more plate-shaped battery cells, the housing having a lower end, an upper end and a pair of side surfaces, each side surface having an upper edge at the upper end of the housing; and
a recess formed in each side surface of the housing, the recess extending from the upper edge of the side wall;
a pair of the electrode terminals extending from the upper end of the housing;
a sensing unit located between adjacent unit modules, the sensing unit being in opposing, facing recesses of the side surfaces of the adjacent unit modules,
wherein sidewalls of adjacent unit modules contact one another,
wherein one of the pair of the electrode terminals from each adjacent unit module directly connects to the sensing unit, and
wherein each battery cell has an electrode assembly mounted in a pouch-shaped battery case made of an aluminum laminate sheet,
wherein the housing includes a frame and a sheathing, wherein the sheathing includes a plurality of first protrusions formed at the outer surface of the sheathing such that the first protrusions extend in the lateral direction of each unit module.

14. The battery pack according to claim 13, wherein the recess is formed by a notch formed in an upper end of the sheathing.

15. The battery module of claim 13, further comprising an opening formed in an upper end or a lower end of the sheathing, and a protrusion corresponding to the opening is formed at an upper end or a lower end of the frame.

* * * * *